US012211372B2

(12) United States Patent
Day et al.

(10) Patent No.: US 12,211,372 B2
(45) Date of Patent: Jan. 28, 2025

(54) VISUAL SIGNALING SYSTEM

(71) Applicant: SAFEEVAC, INC., Evansville, IN (US)

(72) Inventors: Michael Joseph Day, Evansville, IN (US); Michael Lynn Sandefur, Evansville, IN (US)

(73) Assignee: SafeEVAC, Inc., Evansville, IN (US)

( * ) Notice: Subject to any disclaimer, the term of this patent is extended or adjusted under 35 U.S.C. 154(b) by 52 days.

(21) Appl. No.: 17/929,011

(22) PCT Filed: Feb. 19, 2021

(86) PCT No.: PCT/US2021/018779
§ 371 (c)(1),
(2) Date: Aug. 10, 2022

(87) PCT Pub. No.: WO2021/168249
PCT Pub. Date: Aug. 26, 2021

(65) Prior Publication Data

US 2023/0080166 A1 Mar. 16, 2023

Related U.S. Application Data

(60) Provisional application No. 62/978,486, filed on Feb. 19, 2020.

(51) Int. Cl.
*G08B 19/00* (2006.01)
*G08B 5/38* (2006.01)
*G08B 27/00* (2006.01)

(52) U.S. Cl.
CPC ............... *G08B 5/38* (2013.01); *G08B 27/00* (2013.01)

(58) Field of Classification Search
USPC ... 340/691.4, 568.1, 568.8, 572.1, 588, 641, 340/691.6, 825.23, 825.29, 5.91–5.92
See application file for complete search history.

(56) References Cited

U.S. PATENT DOCUMENTS 8,850,845 B1 * 10/2014 Tucker .................... F04B 17/04 417/418
2012/0092183 A1 * 4/2012 Corbett .................. G08B 7/066 340/815.4

(Continued)

FOREIGN PATENT DOCUMENTS

CN 108340834 7/2018
WO 2010117672 10/2010

OTHER PUBLICATIONS

International Preliminary Report on Patentability PCT/US 2021/018779, Sep. 1, 2022.

(Continued)

*Primary Examiner* — Daniel Previl
(74) *Attorney, Agent, or Firm* — Dentons Bingham Greenebaum LLP; Brian W. Chellgren; James C. Eaves, Jr.

(57) ABSTRACT

A visual signaling system includes smart signage with a set of three or more lights visible from a single direction. Activation of the lights in a first pattern indicates a hazard and for individuals to move away from the sign. Activation of the lights in a second pattern indicates safety and for individuals to move toward the sign. Activation of the lights in a third pattern indicates a need for caution and for individuals to refrain from approaching the sign. The visual signaling system may include a plurality of smart signs which display different patterns on different signs depending on the location of each sign relative to the hazard, thereby guiding individuals away from the hazard.

28 Claims, 11 Drawing Sheets

(56) References Cited

U.S. PATENT DOCUMENTS

| | | | | |
|---|---|---|---|---|
| 2014/0015973 | A1* | 1/2014 | Vasquez | B60Q 9/008 348/148 |
| 2015/0287295 | A1* | 10/2015 | Trivelpiece | H04L 45/74 |
| 2016/0011663 | A1* | 1/2016 | Starner | G06F 1/163 345/169 |
| 2018/0020530 | A1* | 1/2018 | Scordato | F21V 29/70 |
| 2019/0295207 | A1* | 9/2019 | Day | G08B 5/38 |
| 2019/0295836 | A1 | 9/2019 | Roberts | |
| 2020/0097048 | A1* | 3/2020 | Hendren | G06F 1/1669 |

OTHER PUBLICATIONS

Extended European Search Report pertaining to European Patent Application No. 21757540.6, SafeEvac Inc., mailed Jan. 31, 2024.

* cited by examiner

VISUAL SIGNALING SYSTEM

CROSS-REFERENCE TO RELATED APPLICATION

This application claims priority to U.S. Provisional Application No. 62/978,486, filed Feb. 19, 2020, incorporated herein by reference.

FIELD OF THE INVENTION

A visual signaling system includes smart signage with a set of three or more lights visible from a single direction. Activation of the lights in a first pattern indicates a threat and for individuals to move away from the sign. Activation of the lights in a second pattern indicates safety and for individuals to move toward the sign. Activation of the lights in a third pattern indicates a need for caution and for individuals to refrain from approaching the sign. The visual signaling system may include a plurality of smart signs which display different patterns on different signs depending on the location of each sign relative to the threat, thereby guiding individuals away from the threat.

BACKGROUND OF THE INVENTION

Traditional security systems and emergency evacuation systems include general visual and auditory alarms. However, these alarms typically provide only a general notice that occupants should exit a building or other area. Threats such as fire or active shooters may be located in a specific threat area, and a general notice to exit a facility could inadvertently result in occupants entering the threat area. Typical security systems and emergency evacuation systems do not provide the type and depth of information that occupants may need in order to identify and avoid a threat area, which would be more effective in minimizing exposure to the threat.

A smart emergency evacuation system is disclosed in U.S. Publication No. 2019/0295207, incorporated herein by reference. This system includes smart signage for directing occupants away from a threat area. However, a significant portion of the population has some level of color blindness, so systems relying upon color alone to indicate safe or threat areas (e.g., green lights versus red lights) will not serve all occupants. Therefore, a need exists to provide advancements in the field of security systems and emergency evacuation systems for offering clear instructions to the occupants within public and private buildings or other public areas when a threat is detected and preferred building exit routes are desired, and do so in a manner suitable for color blind individuals. Preferably, the systems would not rely upon sound so as to be accessible to hearing impaired individuals as well.

The inventors of the present disclosure realized that improvements in security systems and emergency evacuation systems are needed to address the needs of individuals with color blindness. Certain preferred features of the present disclosure address these and other needs and provide other important advantages.

SUMMARY

The present disclosure is directed to a visual signaling system comprising smart signage including three independently controllable lights arranged in a triangular pattern. The lights can be independently activated to display different colors and in different patterns. In preferred embodiments, the smart signage includes at least one set of three lights arranged in a triangular pattern, each set being located on a location on the housing of the sign, such that only a single set of lights is visible to a stationary individual. Different patterns of light activation are used to indicate safe and unsafe conditions. Activation of a set of lights in a first pattern indicates a threat and for individuals to move away from the sign. Activation of a set of lights in a second pattern indicates safety and for individuals to move toward the sign. Activation of a set of lights in an optional third pattern indicates caution and for individuals to refrain from approaching the sign. In some embodiments, the visual signaling system is used in conjunction with a smart emergency evacuation system, such as, for example, the system disclosed in U.S. Publication No. 2019/0295207, which provides electronic instructions to each smart sign to initiate specific patterns of light activation based on the relative location of the sign to a detected threat or other threat. Different patterns of light activation may be displayed on different sides or corners of the sign, depending on the relative location of the sign and a threat, indicating to individuals to move toward or away from the sign as appropriate to guide the individuals away from the threat.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1A:
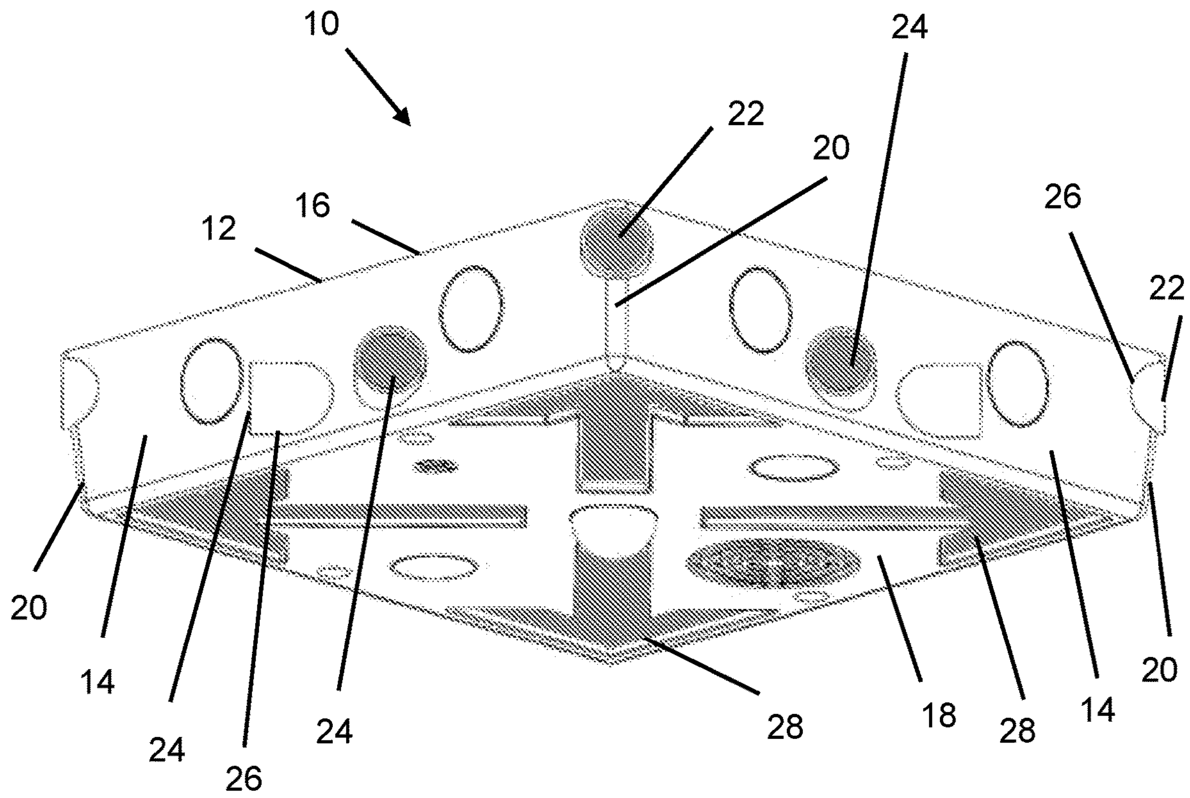
FIG. 1A is a bottom perspective view of a first embodiment of a visual signaling system with lighting indicating a threat.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated. The terms "top" and "bottom" are used herein refer to the orientation of signage shown in the drawings. It should be understood that a sign may be mounted on a ceiling, wall, or other structure at various orientations, such that the "top" may be oriented sideways, at an angle, or upside down.

Figure 1B:
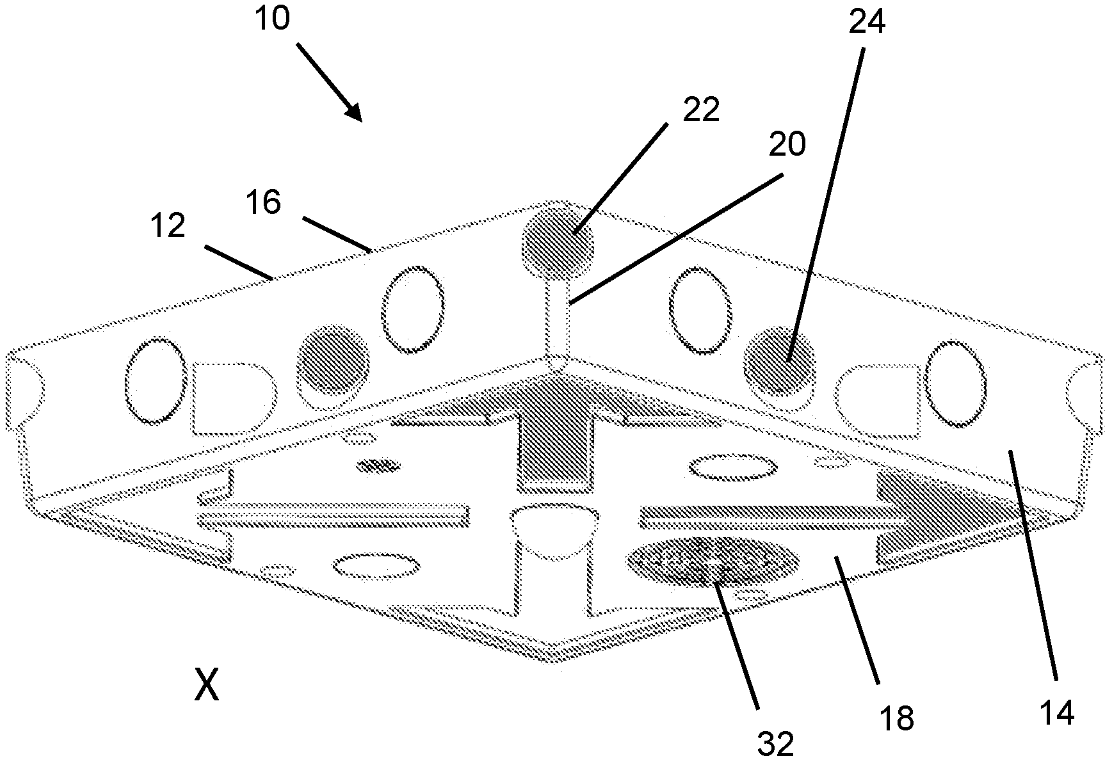
FIG. 1B is a bottom perspective view of the first embodiment of a visual signaling system with lighting indicating caution.
Figure 1C:
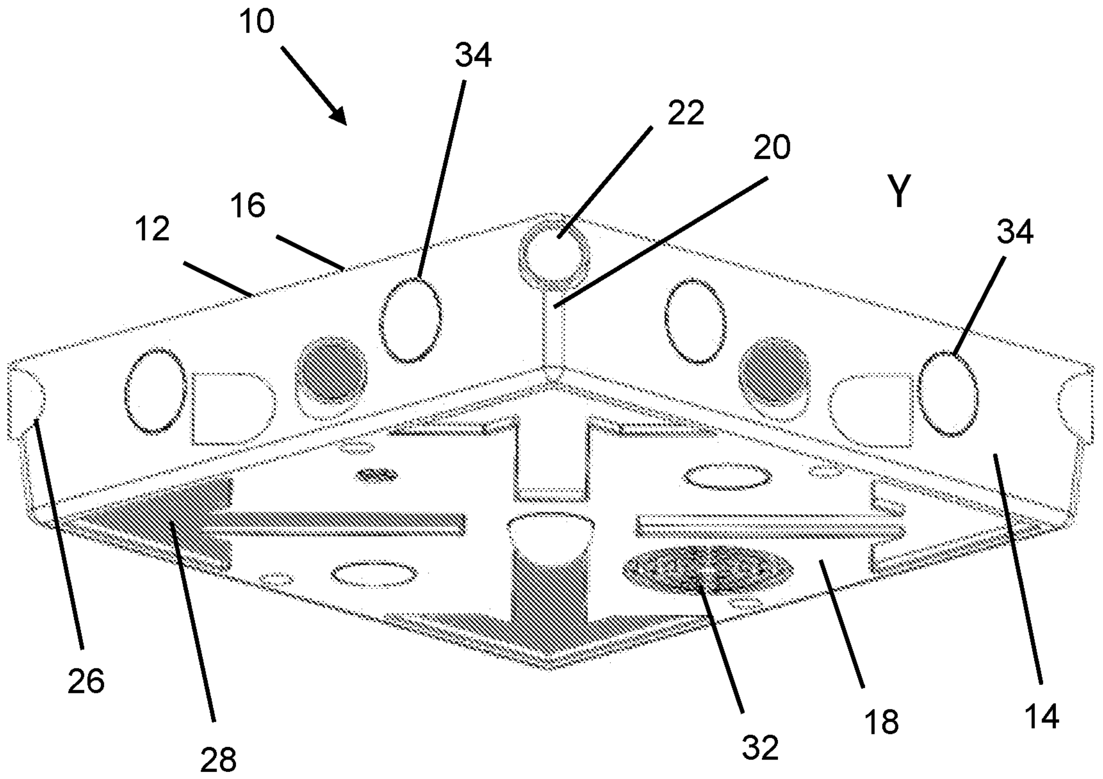
FIG. 1C is a bottom perspective view of the first embodiment of a visual signaling system with lighting indicating a safe direction.

Referring now to FIGS. 1A, 1B, and 1C, a first embodiment of a visual signaling system is an emergency evacuation sign 10 for use at the intersections of hallways. The sign 10 includes a rectangular or square housing 12 having four sides 14, a top 16, and a bottom 18 opposite the top 16. The sides 14 extend between the top 16 and bottom 18, forming four corners 20 at the intersection of each pair of sides 14. In some embodiments, the top 16 is configured to be attached to a ceiling (attachment mechanisms not shown, but typical of those known in the art). The sign 10 is preferably mounted such that each corner 20 of the sign 10 is aligned along each hallway (assuming an intersection of two hallways arranged perpendicularly). Each corner 20 of the sign 10 includes a corner light 22 aligned to illuminate in the direction of that corner 20. Each side 14 includes two side lights 24, with one of the side lights 24 aligned to illuminate each of the corners 20 abutting that side 14. As shown in FIGS. 1A, 1B, and 1C, an individual in a hallway viewing the sign 10 would have a corner light 22 and a side light 24 from each of two sides 14 aligned in that individual's direction. The corner light 22 is positioned closer to the top 16 than the bottom 18 and the side lights 24 are positioned closer to the bottom 18 than the top 16, such that the three lights facing each corner 20 form a triangular pattern. In some embodiments, the lights 22, 24 are each partially enclosed within a cover 26 to direct their illumination in the direction of the respective corner 20 and limit their visibility from the direction of the sides 14 abutting that corner. For each side light 24, the respective cover 26 extends from the side 14 in a non-perpendicular direction aligned with the respective corner 20 to direct the illumination of that side light 22 in the direction of that corner 20. In other embodiments (not shown), the lights 22, 24 may instead be recessed within the housing 12 to accomplish the same purpose. By aligning the illumination of the lights 22, 24 in a single direction (i.e., the direction of the corner 20, which is aligned with the hallway) and restricting the visibility of the lights 22, 24 from the sides 14, an individual standing in a hallway may only see a single set of three lights 22, 24, and therefore will not receive conflicting guidance as lights pointing in different directions may display different illumination patterns.

The bottom 18 includes four directional arrows 28 capable of illumination in a plurality of colors, such as red, green, and yellow. Each directional arrow 28 points in a different, non-identical direction defined by the plane of the bottom 18 (i.e., a first directional arrow pointing in a first direction, a second directional arrow pointing in a second direction, a third directional arrow pointing in a third direction, and a fourth directional arrow pointing in a fourth direction). In the depicted embodiment, each directional arrow 28 points in the direction of a different corner 20, such that each directional arrow 28 points in a direction opposition of another directional arrow 28 and perpendicular to two other directional arrows 28.

In use, a controller, such as a microprocessor, in electronic communication with the sign 10 activates one or more directional arrows 28 and lights 22, 24 on the appropriate sides 14 and corner(s) 20 to facilitate safe evacuation. The controller, either located within the sign or in electronic communication with the sign, is configured to independently illuminate or darken (alternatively referred to as "activate" or "deactivate") each directional arrow 28 and light 22, 24 in the sign 10. In some embodiments, the controller is in communication with a security system or a smart emergency evacuation system, such as, for example, the system disclosed in U.S. Publication No. 2019/0295207, and receives electronic instructions via wired or wireless transmission, causing the controller to activate or deactivate directional arrows 28 and lights 22, 24 in specific patterns based on the relative position of the sign with respect to a detected threat (e.g., an active shooter, a fire, a tornado, etc.).

In a first example shown in FIG. 1A, a threat may be detected in the vicinity of the sign 10. In this example, the controller activates all directional arrows 28 and all lights 22, 24 using red illumination (activated arrows and lights are indicated by grey shading, regardless of the actual color of illumination). The red directional arrows 28 on the bottom 18 of the sign 10 are visible to individuals beneath or close to the sign, and they indicate that the individuals should take any route to escape the vicinity of the sign or shelter in place, if escape is not feasible, regardless of whether the individuals can discern the color of the arrows 28. The red lights 22, 24 on the corners 20 and sides 14 of the sign 10 are visible to individuals further away from the sign, and they indicate that the individuals are in the immediate area of the threat and should avoid the threat by moving away from the sign or shelter in place, if escape is not feasible. The two side lights 24 and corner light 22 of the sign 10 collectively form a triangular pattern, similar to a traditional triangular hazard sign. This indicates to color blind individuals that they are in the vicinity of the threat and should avoid the threat or shelter in place, if escape is not feasible, even if the individuals cannot discern the color of the lights 22, 24.

In a second example shown in FIG. 1B, a threat may be detected at a location remote from the sign 10. In this example, the threat is detected from a direction relative to the sign indicated by the reference letter "X," such that the sign 10 is between the viewer and the threat area. The controller activates one, two, or three directional arrows 28 pointing away from the threat area using green illumination. The green directional arrows 28 on the bottom 18 of the sign 10 are visible to individuals beneath or close to the sign, and they indicate that the individuals should proceed along the hallways aligned with those arrows to move away from the threat area, regardless of whether the individuals can discern the color of the arrows 28. The controller further activates the corner lights 22 and side lights 24 aligned with the activated arrows 28 using yellow illumination. Individuals further away from the sign 10 may view the triangular pattern, similar to a traditional triangular hazard sign, and understand that they should not proceed toward the sign 10 even if they cannot discern the color of the lights. The lights 22, 24 forming the triangular pattern may be activated using constant illumination, using various blinking or flashing patterns, or may be sequentially activated and deactivated in a clockwise or counter-clockwise manner. In some embodiments, the lights 22, 24 may be activated in a triangular pattern rotating clockwise or counter-clockwise depending on the location of the threat relative to the sign 10. In further embodiments, the lights 22, 24 and/or directional arrows 28 may be activated in different colors based on the location of the threat relative to the sign 10.

In a third example shown in FIG. 1C, a threat may be detected at a different location remote from the sign 10. In this example, the threat is detected from a direction relative to the sign indicated by the reference letter "Y," such that the viewer is between the threat area and the sign. The controller activates two directional arrows 28 pointing away from the threat area using green illumination. The green directional arrows 28 on the bottom 18 of the sign 10 are visible to individuals beneath or close to the sign, and they indicate that the individuals should proceed along the hallways aligned with those illuminated directional arrows 28 to move away from the threat area, regardless of whether the individuals can discern the color of the illuminated arrows 28. The controller further activates the side lights 24 aligned with the non-activated directional arrows 28 using green illumination. As the corner light 22 is not activated, no triangle pattern is formed. As such, individuals further away from the sign 10 understand that they should proceed toward the sign 10 to move away from the threat area and follow the illuminated arrows 28 to proceed toward a safe area, even if the individuals cannot discern the color of the lights.

Figure 2A:
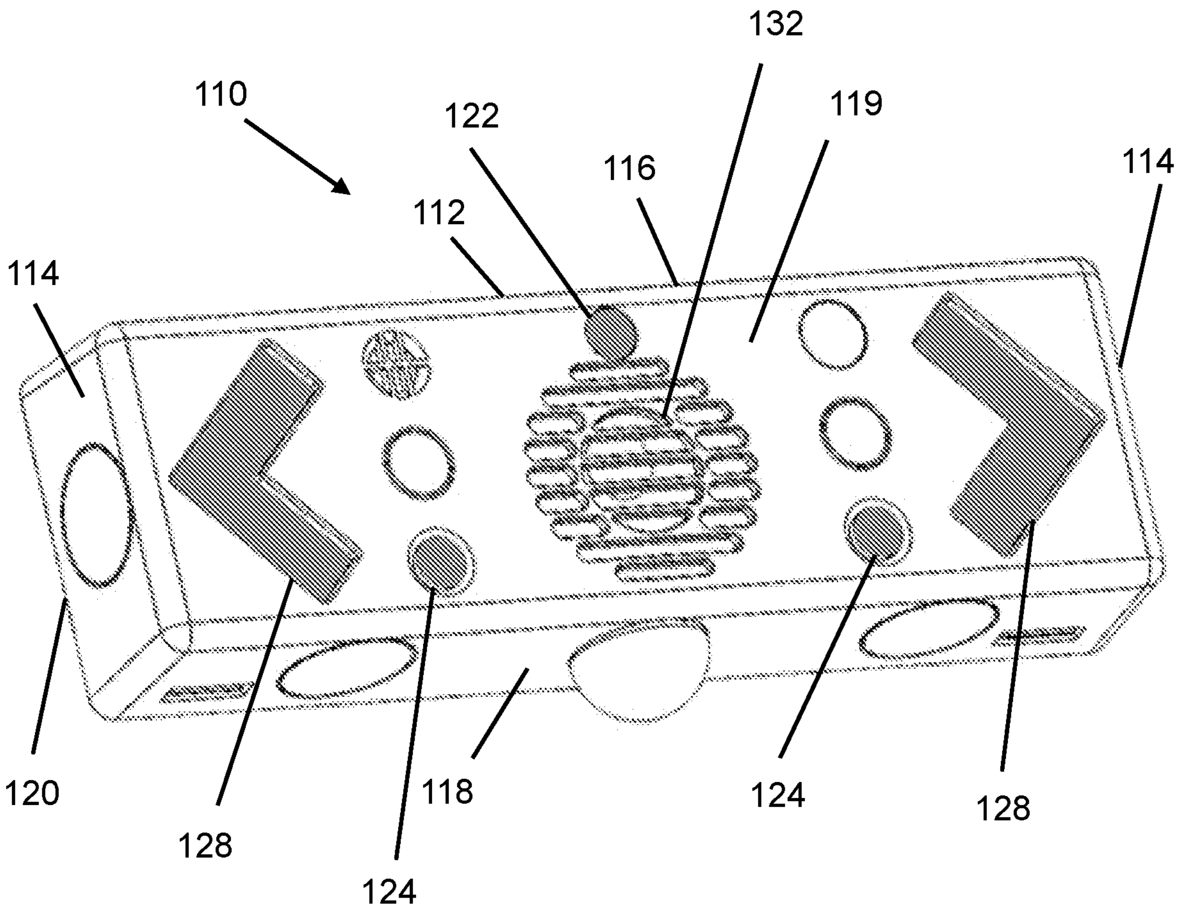
FIG. 2A is a front perspective view of a second embodiment of a visual signaling system with lighting indicating a threat.
Figure 2B:
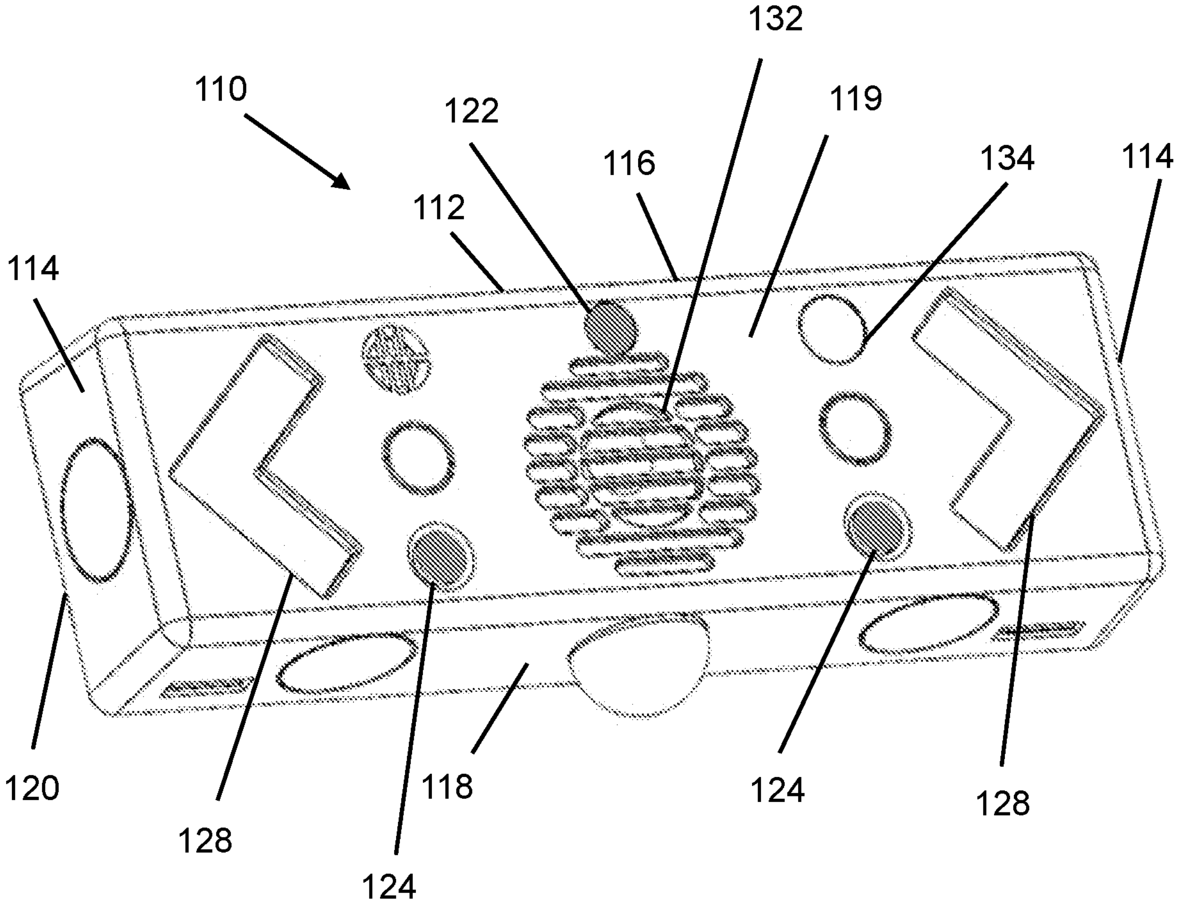
FIG. 2B is a front perspective view of the second embodiment of a visual signaling system with lighting indicating caution.
Figure 2C:
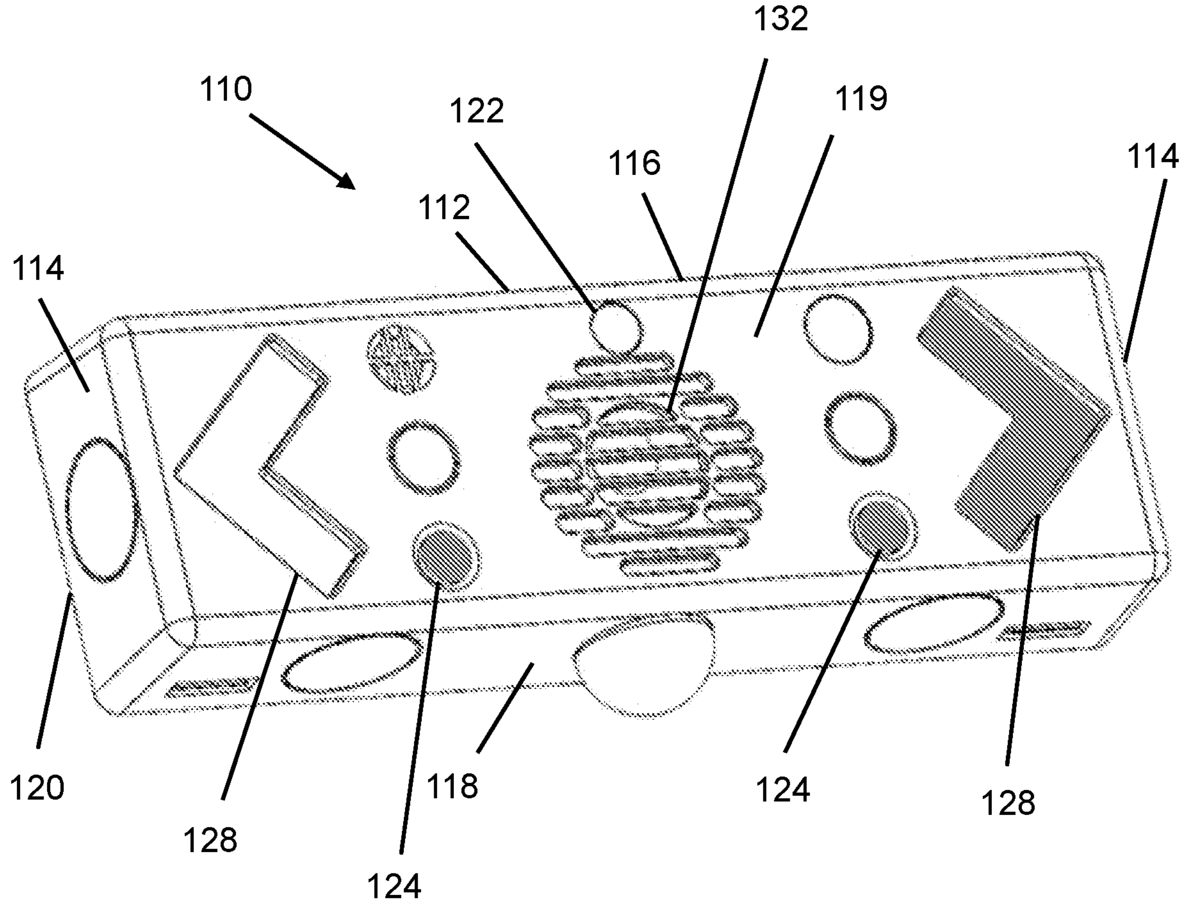
FIG. 2C is a front perspective view of the second embodiment of a visual signaling system with lighting indicating a safe direction.

Referring now to FIGS. 2A, 2B, and 2C, a second embodiment of a visual signaling system is an emergency evacuation sign 110. The sign 110 includes a housing 112 having opposing sides 114, a top 116, a bottom 118 opposite the top 116, a front 119, and a rear 120 opposite the front 119. The front 119 includes three lights arranged in a triangular pattern including an upper light 122 positioned closer to the top 116 than the bottom 118 and two side lights 124 that are positioned closer to the bottom 118 than the top 116. In some embodiments, the lights 122, 124 are recessed within the housing 112 to direct their illumination in the direction of the front 119 and limit their visibility from the directions of the sides 114. In other embodiments (not shown), the lights 122, 124 may instead be partially enclosed within a cover to accomplish the same purpose. The front 119 additionally includes two directional arrows 128 capable of illumination plurality of colors, such as red, green, and yellow. Each directional arrow 128 points in a different, non-identical direction defined by the plane of the front 119 (i.e., a first directional arrow pointing in a first direction and a second directional arrow pointing in a second direction). In the depict embodiment, the two directional arrows 128 point in opposite directions, each pointed toward a different side 114.

In some embodiments, the rear 120 is configured to be attached to a wall (attachment mechanisms not shown, but typical of those known in the art). In this embodiment, the sign 110 is mounted such that each side 114 of the sign 110 is aligned along a hallway or above a door to indicate the appropriate evacuation direction. In other embodiments (not shown), the rear 120, top 116, or side 114 is configured to be attached to the side, top, or bottom of a standard exit sign as generally known in the art. In embodiments configured to attach to the side of a standard exit sign, the orientation of the directional arrows may each be rotated ninety degrees in opposite directions, such that the arrows point left and right instead of up and down.

In use, a controller in electronic communication with the sign 110 activates one or more directional arrows 128 and lights 122, 124 to facilitate safe evacuation. In a first example shown in FIG. 2A, a threat may be detected in the vicinity of the sign 110. In this example, the controller activates all directional arrows 128 and all lights 122, 124 using red illumination. The red directional arrows 128 indicate that the individuals should take any route to escape the vicinity of the sign or shelter in place, as appropriate, regardless of whether the individuals can discern the color of the arrows 128. The red lights 122, 124 indicate that the individuals are in the immediate area of the threat and should avoid the threat by moving away from the sign or shelter in place, if escape is not feasible. In particular, the two lower lights 124 and upper light 122 form a triangular pattern, similar to a traditional triangular hazard sign. This indicates to color blind individuals that they are in the vicinity of the threat and should avoid the threat or shelter in place, as appropriate, even if the individuals cannot discern the color of the lights 122, 124.

In a second example shown in FIG. 2B, a threat may be detected at a location remote from the sign 110. In this example, the threat is detected from a direction behind the sign as viewed in FIG. 2B, such that the sign 210 is between the viewer and the threat area. The controller deactivates both directional arrows 128 and activates lights 122, 124 using yellow illumination. Individuals viewing the sign 110 may view the triangular pattern, similar to a traditional triangular hazard sign, and understand that they should not proceed toward the sign 110. As noted in connection with the first example, the lights 122, 124, may be activated using constant illumination, using various blinking or flashing patterns, or may be sequentially activated and deactivated in a clockwise or counter-clockwise manner, which may be used to indicate the location of the threat relative to the sign 110.

In a third example shown in FIG. 2C, a threat may be detected at a location remote from the sign 110. In this example, the threat is detected from a direction indicated by the reference letter "Z," such that, from the point of view of individuals viewing the sign as shown in FIG. 2B, the threat area is located to the left. The controller activates the directional arrow 128 pointing away from the threat area using green illumination. This illuminated directional arrow 128 indicates that the individuals should proceed in that direction to move away from the threat area, regardless of whether the individuals can discern the color of the arrow 128. The directional arrow pointing in the direction of the threat area remains deactivated. The controller further activates the lower lights 124 using green illumination. As the upper light 122 is not activated, no triangle pattern is formed. As such, individuals further away from the sign 110 understand that they may move toward the sign 110 and proceed in the direction of the arrow 128 to move away from the threat area and proceed toward a safe area, even if the individuals cannot discern the color of the lights.

Figure 3A:
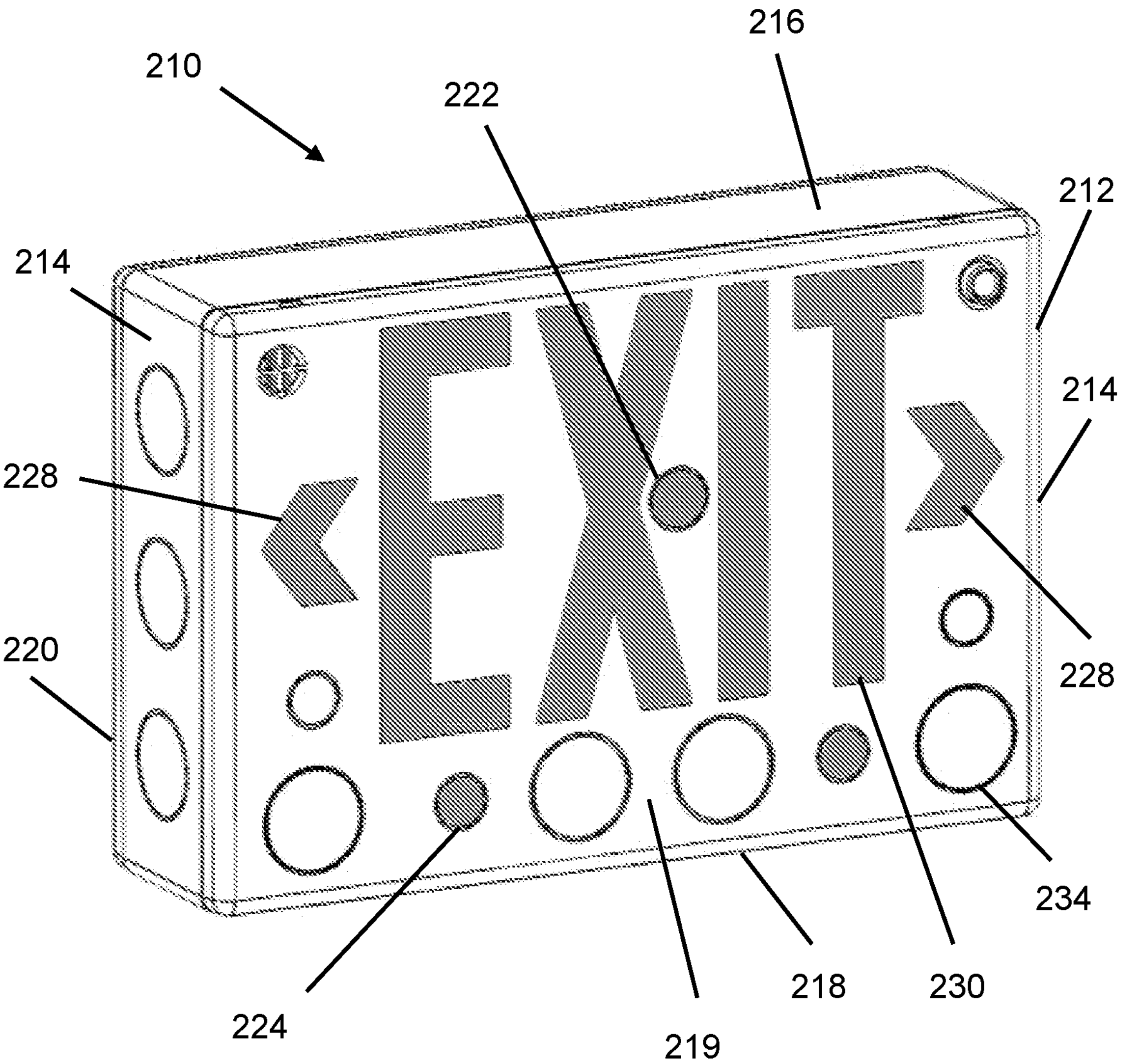
FIG. 3A is a front perspective view of a third embodiment of a visual signaling system with lighting indicating a threat.
Figure 3B:
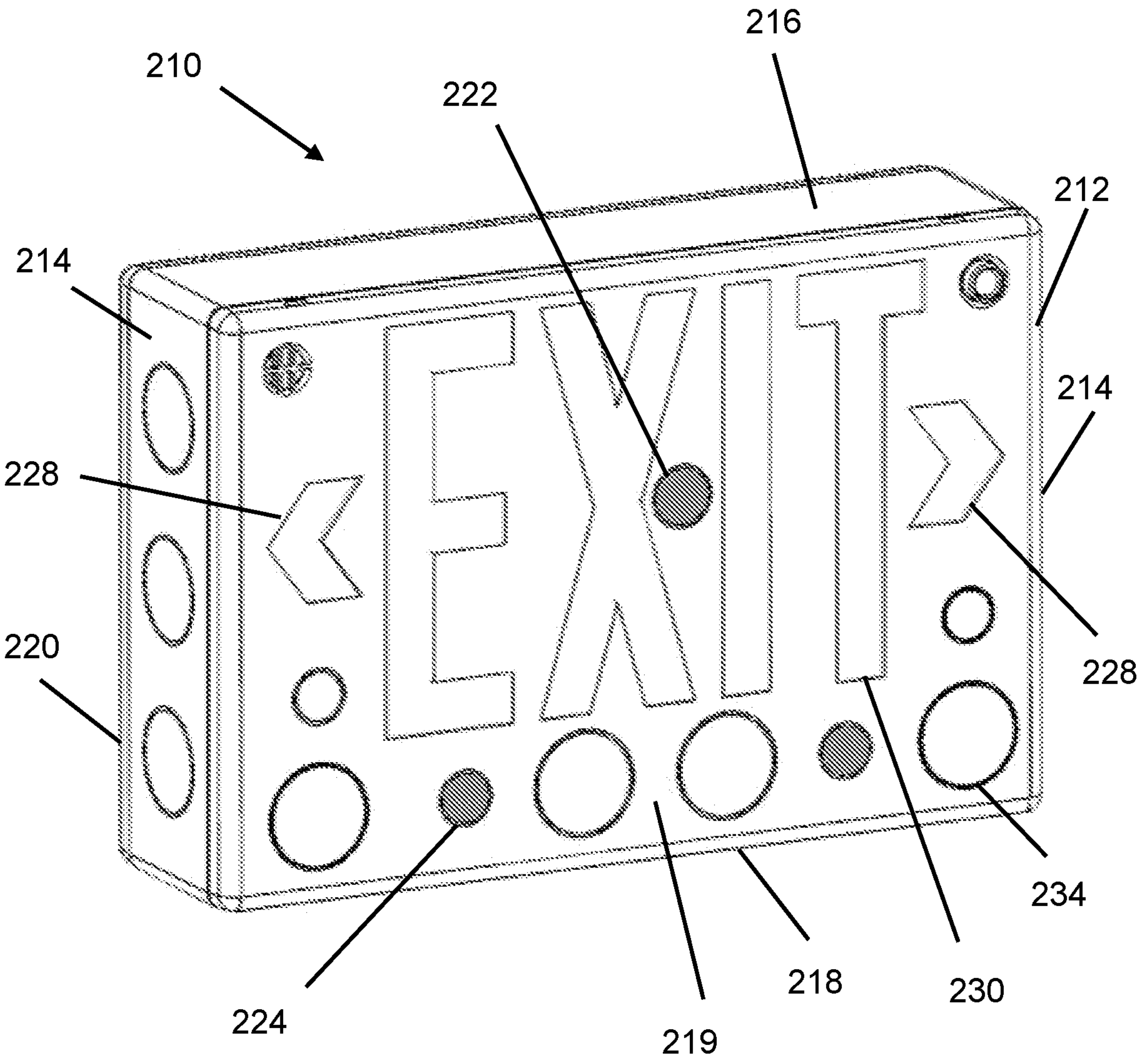
FIG. 3B is a front perspective view of the third embodiment of a visual signaling system with lighting indicating caution.
Figure 3C:
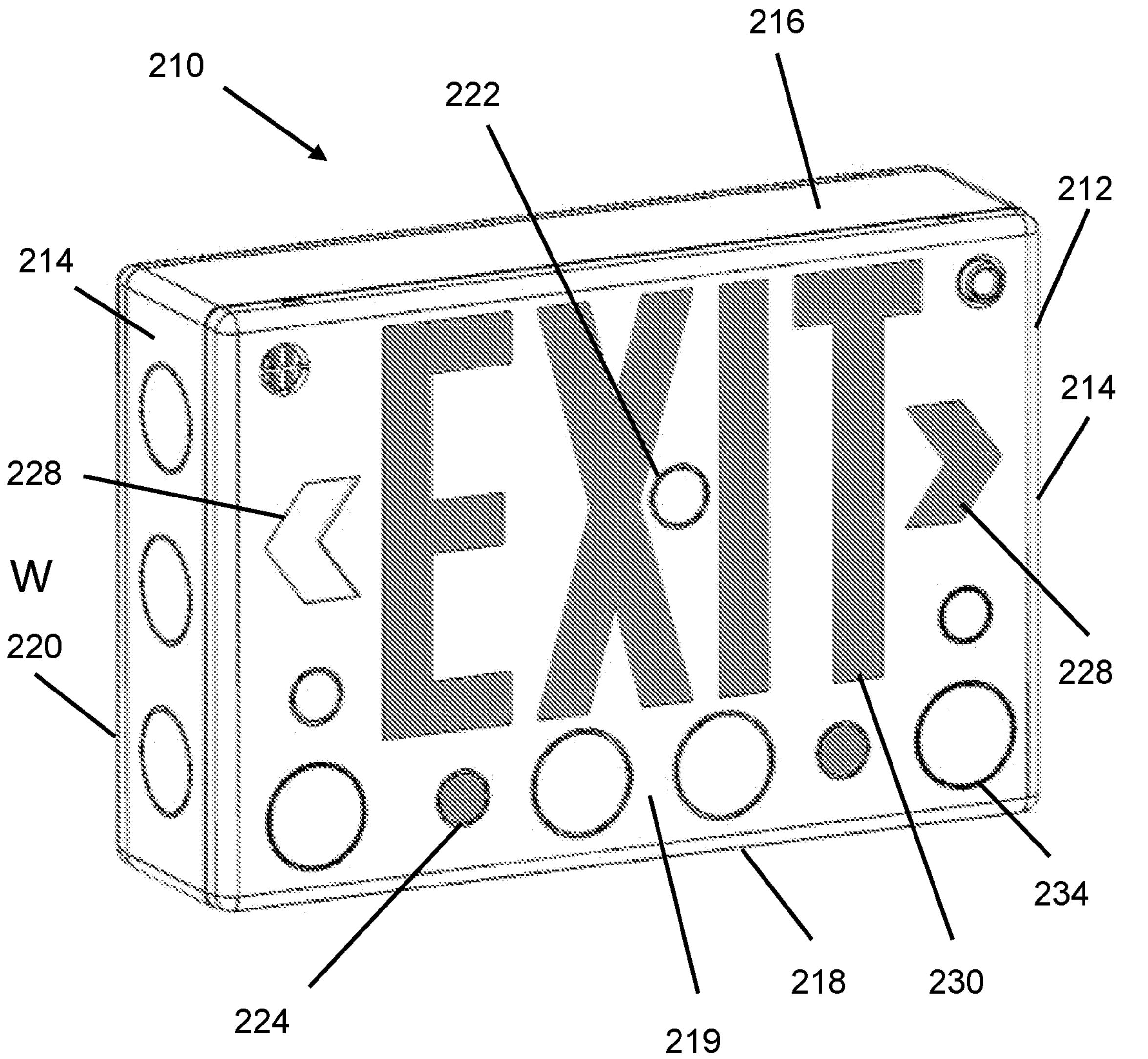
FIG. 3C is a front perspective view of the third embodiment of a visual signaling system with lighting indicating a safe direction.

Referring now to FIGS. 3A, 3B, and 3C, a third embodiment of a visual signaling system is an exit sign 210. The sign 210 includes a housing 212 having opposing sides 214, a top 216, a bottom 218 opposite the top 216, a front 219, and a rear 220 opposite the front 219. The front 219 includes three lights arranged in a triangular pattern including an upper light 222 positioned closer to the top 216 than the bottom 218 and two side lights 224 that are positioned closer to the bottom 218 than the top 216. In some embodiments, the lights 222, 224 are recessed within the housing 212 to direct their illumination in the direction of the front 219 and limit their visibility from the directions of the sides 214. In other embodiments (not shown), the lights 222, 224 may instead be partially enclosed within a cover to accomplish the same purpose. The front 219 additionally includes two directional arrows 228 capable of illumination plurality of colors, such as red, green, and yellow. Each directional arrow 228 points in a different, non-identical direction defined by the plane of the front 219 (i.e., a first directional arrow pointing in a first direction and a second directional arrow pointing in a second direction). In the depict embodiment, the two directional arrows 228 point in opposite directions, each pointed toward a different side 214.

The front 219 further includes an exit nomenclature 230 capable of illumination. The exit nomenclature may be the actual word "EXIT," as shown in FIGS. 3A-3C, or may be a word or words conveying similar information in English or other languages (e.g., "SALIDA" or "SORTIE") or non-word logo or design conveying similar information (e.g., an image of a running person) as may be required by applicable language, law, statute, or regulation. In some embodiments, the rear 220 is configured to be attached to a wall (attachment mechanisms not shown). In other embodiments (not shown), the top is configured to be attached to a ceiling and the rear is substantially identical to the front, having lights 222, 224, arrows 228, and EXIT nomenclature 230. The sign 210 is preferably utilized in locations where standard exit signs are typically utilized to indicate egress in compliance with fire codes or other logical locations, such as, for example, in the interior of a building above a doorway leading outside the building.

In use, a controller in electronic communication with the sign 210 activates one or more directional arrows 228, lights 222, 224, and EXIT nomenclature 230 to facilitate safe evacuation. In a first example shown in FIG. 3A, a threat may be detected in the vicinity of the sign 210. The controller activates directional arrows 228, lights 222, 224, and EXIT nomenclature 230 using red illumination (if the EXIT nomenclature 230 was already illuminated in green, the color changes to red). The red directional arrows 228 indicate that the individuals should avoid the threat by moving away from the sign or shelter in place, if escape is not feasible, regardless of whether the individuals can discern the color of the arrows 228. The red EXIT nomenclature and red lights 222, 224 indicate that the individuals are in the immediate area of the threat and should avoid the threat or shelter in place, as appropriate. In particular, the two lower lights 224 and upper light 222 form a triangular pattern, similar to a traditional triangular hazard sign. This indicates to color blind individuals that they are in the vicinity of the threat and should avoid the threat or shelter in place, as appropriate, even if the individuals cannot discern the color of the lights 222, 224.

In a second example shown in FIG. 3B, a threat may be detected at a location remote from the sign 210. In this example, the threat is detected from a direction behind the sign as viewed in FIG. 3B, such that the sign 210 is between the viewer and the threat area. The controller deactivates both directional arrows 228 and the EXIT nomenclature 230. The controller activates the lights 222, 224 using yellow illumination. Individuals viewing the sign 210 may view the triangular pattern, similar to a traditional triangular hazard sign, and understand that they should not proceed toward the sign 210.

In a third example shown in FIG. 3C, a threat may be detected at a location remote from the sign 210. In this example, the threat is detected from a direction relative to the sign indicated by the reference letter "W," such that, from the point of view of individuals viewing the sign as shown in FIG. 3C, the threat area is located to the left. The controller activates the directional arrow 228 pointing away from the threat area using green illumination. This illuminated arrow 228 indicates that the individuals should proceed along the hallway to the right to move away from the threat area, regardless of whether the individuals can discern the color of the illuminated arrow 228. The directional arrow 228 pointing in the direction of the threat area remains deactivated. The controller further activates the lower lights 224 using green illumination. As the upper light 222 is not activated, no triangle pattern is formed. As such, individuals further away from the sign 210 understand that they may move toward the sign 210 and proceed in the direction of the illuminated arrow 228 to move away from the threat area and proceed toward a safe area, even if the individuals cannot discern the color of the lights. The EXIT nomenclature 230 remains activated with green illumination.

Figure 4A:
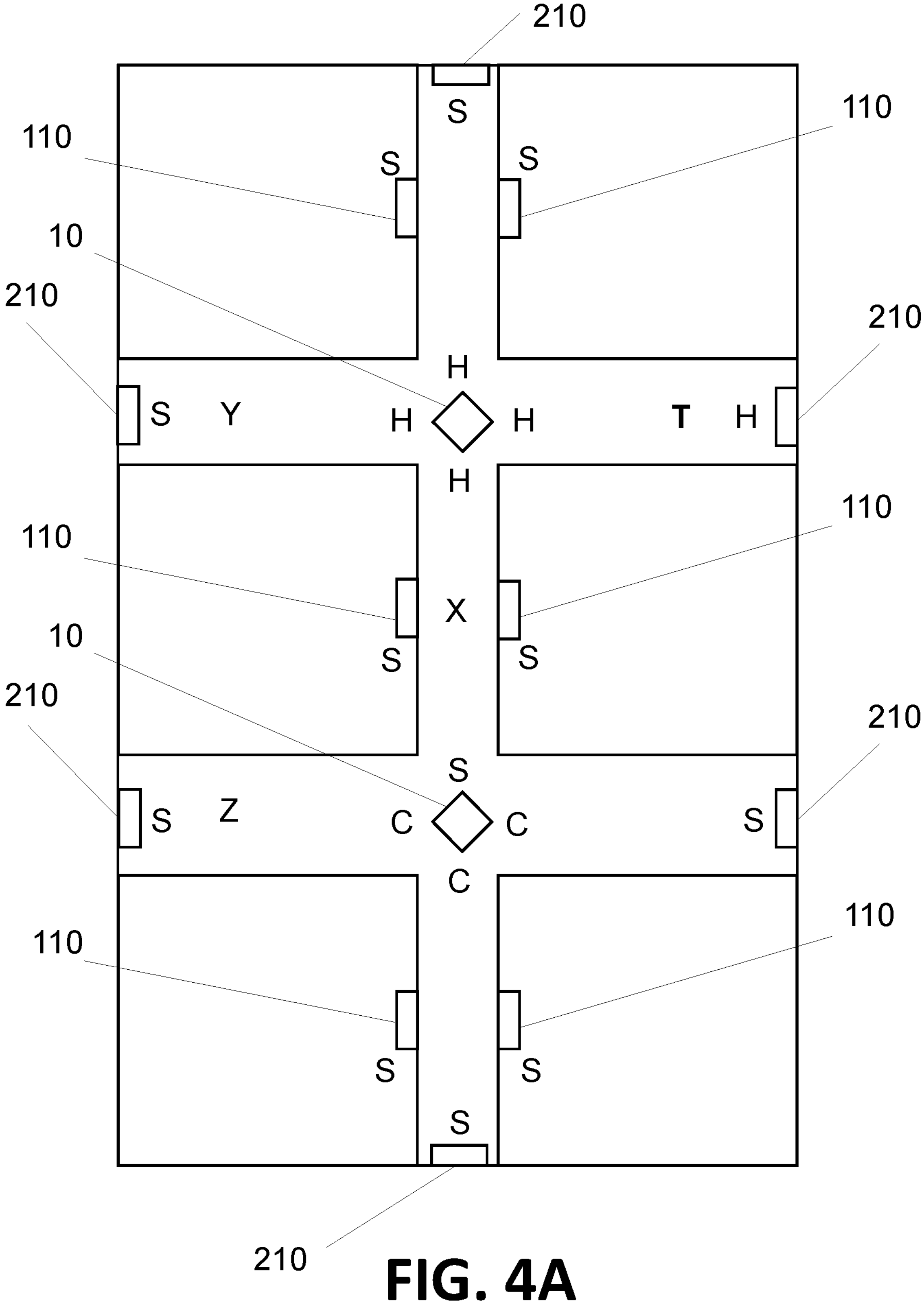
FIG. 4A is an exemplary floorplan of a building equipped with a visual signaling system, wherein a threat is detected at the location indicated by the letter "T."
Figure 4B:
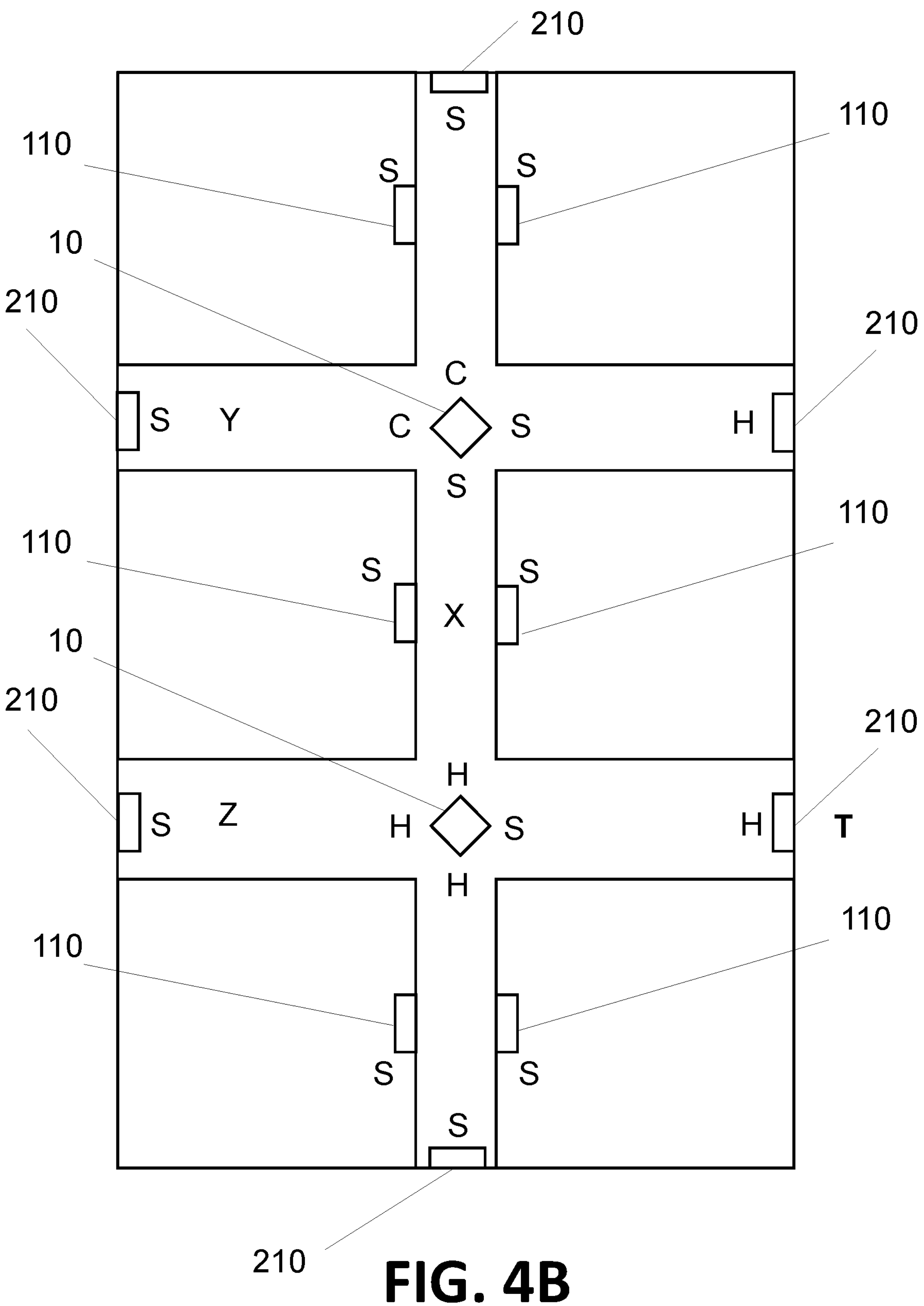
FIG. 4B is the exemplary floorplan of FIG. 4A, wherein a threat is detected at a different location indicated by the letter "T."

FIGS. 4A and 4B depict an exemplary floorplan of a building equipped with a visual signaling system and explain coordinated use of multiple signs 10, 110, 210. For the purpose of these figures, "north" is the direction towards the top of the page, "south" is the direction towards the bottom of the page, and "east" and "west" are the directions toward the right and left of the page, respectively. This exemplary building includes a hallway X extending north-south and two hallways Y and Z extending east-west, wherein hallways X and Y intersect and hallways X and Z intersect. Signs 10 are attached to the ceiling at the intersections of hallways X and Y and at the intersection of hallways X and Z. Signs 110 are located in the interiors of rooms, positioned above doors leading from the rooms into the hallways. Exit signs 210 are positioned above doors leading to the exterior of the building.

In FIG. 4A, an emergency evacuation system detects a threat at location T. The various signs 10, 110, 210, receive electronic instructions from the emergency evacuation system to activate their various lights as shown in the figure, wherein "H" represents activation of a first pattern of lights indicating a hazard (the words "hazard" and "threat" are used interchangeably herein to reference an actual or potential source of danger), "S" represents activation of a second pattern of lights indicating a safe direction (e.g., only the two lower lights 24, 124, 224 visible from a single direction being activated using green illumination), and "C" represents activation of a third pattern of lights indicating caution (e.g., all three lights 22, 24, 122, 124, 222, 224 visible from a single direction being activated using yellow illumination). For hallway intersection signs 10, four letters are displayed at the corners of the signs 10, indicating the pattern of lights visible from each corner. Directional arrows 28 pointing in the directions of the second pattern of lights (S) are activated, while arrows 28 pointing in the directions of the first pattern of lights (H) and third pattern of lights (C) are inactivated, such that the activated arrows 28 guide viewers near or underneath the sign 10 in safe directions. For a first example, an individual located in hallway Y at the location of the letter Y, would view the sign 10 the sign 10 located to the east at the intersection of hallways X and Y as displaying a first pattern of lights indicating a hazard. The individual would then understand to move in the opposite direction, towards the nearby exit on and associated exit sign 210 displaying the second pattern of lights indicating a safe direction to the west. For a second example, an individual located in hallway X at the location of the letter X would view the sign 10 to the north at the intersection of hallways X and Y displaying a first pattern of lights indicating a hazard and would view the sign 10 to the south at the intersection of hallways X and Z displaying a second pattern of lights indicating safety, and would understand to move south, thereby moving away from the threat "T." For a third example, an individual located in hallway Z at the location of the letter Z would view the sign 10 to the east at the intersection of hallways X and Z displaying a third pattern of lights indicating caution.

For signs 110, the letter "S" is positioned near one side of each sign 110. The position of the S indicates that the second pattern of lights is accompanied by a direction arrow pointing in the direction indicated by the letter. As such, viewers located in each room in the building can view their respective sign 110 and exit the room in the direction indicated by the directional arrow to move away from the threat "T." For example, an individual located in the room at the northeast corner of the building would see sign 110 illuminated in the second pattern and illuminating a directional arrow pointing north (i.e., the illumination pattern shown in FIG. 2C). The individual would then understand to exit the room and move northward, then exit the building through the northern exit with exit sign 210 displaying the second pattern.

In FIG. 4B, an emergency evacuation system detects a threat at location T outside the building. As compared to FIG. 4A, the pattern of light activation differs as the location of the threat differs. An individual located in hallway Z at the location indicated by letter Z would see the nearby hallway intersection sign 10 displaying the first pattern of lights—indicating a hazard. The individual may also see the exit sign 210 at the east end of hallway Z displaying the first pattern of lights (i.e., the illumination pattern shown in FIG. 3A). Based on these visual instructions, the individual would move west then exit the building through the western exit with exit sign 210 displaying the second pattern.

In some embodiments, lights 22, 24, 122, 124, 222, 224 are strobe lights. In further embodiments, a triangular pattern of lights 22, 24, 122, 124, 222, 224 may be activated in a specific timing pattern to produce a rotating clockwise or counter-clockwise, top-to-bottom, bottom-to-top, side-to-side, or other pattern of illumination. In the embodiments described above, a first pattern of illumination, namely, activation of two lower lights 124, 224 or side lights 24 and activation of an upper light 122, 222 or corner light 22 to form a triangle of activated lights, is used to indicate an unsafe direction and a hazardous area and to instruct viewers to move away from the sign. A second pattern of illumination, namely, activation of two lower lights 124, 224 or side lights 24 and deactivation of an upper light 122, 222 or corner light 22, is used to indicate a safe direction and to instruct viewers to move toward the sign and continue in the direction indicated by one or more illuminated directional arrows. In some embodiments, the invention utilizes a third pattern of illumination, namely, activation of two lower lights 124, 224 or side lights 24 and activation of an upper light 122, 222 or corner light 22 to form a triangle of activated lights, is used to indicate caution and a hazardous area and to instruct viewers to refrain from approaching the sign. The first pattern and third pattern are distinguished by the timing of illumination, for example, the first pattern may activate the three lights in a rotating clockwise pattern of illumination while the third pattern may activate the three lights in a rotating counter-clockwise pattern of illumination. The various patterns may also be distinguished by color, wherein the first pattern is illuminated in red, the second pattern in green, and the third pattern in yellow. However, the first, second, and third patterns are distinguishable regardless of color, and the visual signaling system does not require an audible component, so the system is accessible to colorblind and hearing impaired individuals.

It should be understood that the triangular pattern of lights shown in the drawings is provided for example purposes only and is not intended to be limiting. In other embodiments, the centrally located corner lights 22 and upper lights 122, 222 may be located below the adjacent side lights 24 and lower lights 124, 224 such that the triangular pattern may be inverted as compared to the pattern shown in the drawings. In other embodiments, visual signaling systems may include three or more lights arranged in other patterns, such as, for example, having two vertically arranged corner lights or upper lights, such that the various lights form a diamond pattern instead of a triangle. In further embodiments, lights may be arranged in squares, pentagons, or other geometric or non-geometric patterns. It should be understood that different first patterns and second patterns of illumination may be used with different patterns of lights. For example, in embodiments with a diamond pattern of lights, a first pattern of activating all four lights indicates a threat area and a second pattern of activating only the two vertically-aligned corner or upper lights indicates a safe direction.

In some embodiments, the sign 10, 110, 210 includes a sound emitter, such as, for example, a speaker (not visible), internal to the housing 12, 112, 212 and the housing 12, 112, 212 includes slits, grooves, or other openings 32, 132, 232 for transmission of sound from the sound emitter out of the housing 12, 112, 212. The sound emitter can be used for audibly alerting individuals of potential or real threats by emitting alarms, sirens, spoken warning messages, or other audible alerts. In further embodiments, the housing 12, 112, 212 includes one or more removable knockouts 34, 134, 234 to allow for the incorporation of output devices, such as additional lights, sound emitters (e.g., speakers) or other output devices as known in the art, or input devices, such as sound detectors (e.g., microphones), temperature detectors (e.g., thermometers), or other input devices as known in the art, into the housing 12, 112, 212. In certain embodiments, activation of the lights 22, 24, 122, 124, 222, 224 and directional arrows 28, 128, 228 is controlled by an internal controller in electronic communication with a remote master controller in electronic communication with one or more sensors capable of detecting a threat area, as described in U.S. Publication No. 2019/0295207. In some embodiments, the input devices are microphones, audio data obtained by the microphones are transmitted by the internal controller to the master controller, and the master controller uses the audio data from microphones in multiple signs 10, 110, 210 to triangulate the location of a threat (i.e., an active shooter, as detected by the sound of a gunshot). In other embodiments, the input devices are thermometers, temperature data from the thermometers are transmitted by the internal controller to the master controller, and the master controller uses the temperature data from multiple signs 10, 110, 210 to triangulate the location of a threat (i.e., a fire, as detected by elevated temperature).

The signs 10, 110, 210 may include internal components for performing power conversion and network communication. For example, the components inside the housing 12, 112, 212 of the sign 10, 110, 210 may include a power converter, a circuit board, wired communication port, wireless communication port, hardwired power for receiving electric power, a battery back-up supply, and other components as generally known in the art.

While the signs 10, 110, 210 are described as being rectangular or square in shape, it should be understood that other shapes are contemplated. For example, a hallway intersection sign designed for use in a T-intersection, where one hallway terminates at a position along the length of another hallway, a triangular-shaped intersection sign having three sides may be used. In other embodiments, a hallway intersection sign may be cylindrical or disc-shaped, having only a single side, and may include lights spaced about the circumference of the sign in triangular patterns aligned with each hallway meeting at the intersection. Furthermore, the disclosed signs 10, 110, 210 need not necessarily be located at the intersections of hallways or along hallways, but could also be positioned in large open rooms with multiple exits or other locations where their use would be logical.

Various aspects of different embodiments of the present disclosure are expressed in paragraphs X1, X2, and X3 as follows:

X1. An embodiment of the present disclosure include a smart sign comprising a housing including a top, a bottom, and at least one side extending between the top and the bottom; a plurality of independently illuminable directional arrows located on the housing; each of the plurality of independently illuminable directional arrows pointing in different directions; a set of at least three independently illuminable lights located on the housing; and a controller internal to the housing, the controller configured to independently activate or deactivate each directional arrow and each light.

X2. Another embodiment of the present disclosure includes a visual signaling system accessible to colorblind and hearing impaired individuals, the system comprising a master controller; and a plurality of smart signs according to claim 1, each of said smart signs being in electronic communication with said master controller.

X3. A further embodiment of the present disclosure includes a method for providing visual signaling within a facility during a hazardous event, comprising receiving, by a master controller, electronic information from an input device regarding the location of a hazard; communicating, by the master controller, to a plurality of smart signs according to claim 1, said smart signs being located on or within the facility, instructions to activate lights and directional arrows on said plurality of smart signs to direct individuals away from the location of the hazard.

Yet other embodiments include the features described in any of the previous paragraphs X1, X2, or X3 as combined with one of more of the following aspects:

Means for electronic communication between the smart sign and a remotely located master controller.

Means for attaching the smart sign to a ceiling.

Means for attaching the smart sign to a wall.

Means for attaching the smart sign to a preexisting exit sign.

Wherein the controller is configured to receive electronic instructions from the master controller to activate or deactivate each directional arrow and each light.

Wherein the set of at least three lights is activatable in a first pattern or a second pattern, the first pattern and second pattern being non-identical.

Wherein the set of at least three lights is activatable in a third pattern, the third pattern being non-identical to the first pattern and the second pattern.

Wherein the set of at least three lights is three lights arranged in a triangular pattern.

Wherein the at least three lights are arranged on housing so as to be visible from a single direction.

Wherein the plurality of directional arrows includes at least two directional arrows pointing in opposite directions.

At least one of an input device and an output device.

Wherein the at least one input device includes a sound detector and wherein the at least one output device includes a sound emitter.

Wherein the plurality of directional arrows are located on the bottom of the housing.

Wherein each of the plurality of directional arrows point in different directions on a plane defined by the bottom of the housing.

Wherein the at least one side is a plurality of adjacent sides.

Wherein two of the plurality of adjacent sides form a corner.

Wherein the set of at least three lights includes a corner light located on the corner, and a side light on each of the two sides adjacent the corner.

Wherein the corner light and the side light on each side adjacent the corner are aligned to illuminate in a direction of the corner.

Wherein the corner light and the side light on each side adjacent the corner are arranged in a triangular pattern visible from the direction of the corner.

Wherein at least one of the corner light and the side lights is partially enclosed within a cover reducing the visibility of said corner light and said side lights from directions other than the direction of the corner.

Wherein the set of at least three lights located on the housing is two sets of at least three lights, each of the sets being spaced about 180 degrees from each other around the housing.

Wherein the set of at least three lights located on the housing is four sets of at least three lights, each of the sets being spaced about 90 degrees from each other around the housing.

Wherein the plurality of directional arrows includes a first directional arrow pointing in a first direction and a second directional arrow pointing in a second direction, the second direction being opposite the first direction.

Wherein the housing includes two opposing sides extending between the top and the bottom, a front extending between the top, the bottom, and the two sides, and a back extending between the top, the bottom, and the two sides.

Wherein the at least three lights are three lights arranged in a triangular pattern on the front of the sign.

An independently illuminable exit nomenclature.

Wherein the three lights are recessed in the housing effective to reduce visibility of the lights from the sides.

Wherein the plurality of directional arrows are located on the front of the housing.

Wherein each of the plurality of directional arrows point in different directions on a plane defined by the front of the housing.

Reference systems that may be used herein can refer generally to various directions (e.g., top, bottom, leftward, rightward, forward and rearward, north, south, east, and west), which are merely offered to assist the reader in understanding the various embodiments of the disclosure and are not to be interpreted as limiting. It should be understood that the disclosed signage may be mounted at different locations and different orientations with respect to different hallways, walls, ceilings, rooms, or other locations. Other reference systems may be used to describe various embodiments.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A smart sign comprising:

a housing including a top, a bottom, and at least one side extending between the top and the bottom;

a plurality of independently illuminable directional arrows located on the housing; each of the plurality of independently illuminable directional arrows pointing in different directions;

at least one set of at least three independently illuminable lights located on the housing, one of the three lights located toward the top of the housing and two of the lights located toward the bottom of the housing, these three lights each being located at a vertex of a triangle, such that, only when all three lights are illuminated, a person viewing will perceive a triangular pattern; and a controller internal to the housing, the controller configured to independently activate or deactivate each directional arrow and each light.

2. The smart sign of claim 1, further comprising means for electronic communication between the smart sign and a remotely located master controller.

3. The smart sign of claim 2, wherein the controller is configured to receive electronic instructions from the master controller to activate or deactivate each directional arrow and each light.

4. The smart sign of claim 1, wherein the set of at least three lights is activatable in a first pattern or a second pattern, the first pattern and second pattern being non-identical.

5. The smart sign of claim 4, wherein the set of at least three lights is activatable in a third pattern, the third pattern being non-identical to the first pattern and the second pattern.

6. The smart sign of claim 1, wherein the at least three lights are arranged on housing so as to be visible from a single direction.

7. The smart sign of claim 1, wherein the plurality of directional arrows includes at least two directional arrows pointing in opposite directions.

8. The smart sign of claim 1, further comprising at least one of an input device and an output device.

9. The smart sign of claim 1, wherein the at least one input device includes a sound detector and wherein the at least one output device includes a sound emitter.

10. The smart sign of claim 1, wherein the plurality of directional arrows are located on the bottom of the housing; and wherein each of the plurality of directional arrows point in different directions on a plane defined by the bottom of the housing.

11. The smart sign of claim 1, wherein the at least one side is a plurality of adjacent sides and wherein the at least one set of at least three independently illuminable lights located on the housing is a plurality of sets of at least three independently illuminable lights;

wherein each two adjacent sides of the plurality of adjacent sides forms a corner; and wherein each set of at least three lights includes a corner light located on the corner which is the light located closer to the top of the housing and a side light on each of the two sides adjacent the corner which are the lights located toward the bottom of the housing, these three lights being the three lights each located at a vertex of a triangle, the three lights aligned to illuminate in a direction away from the corner, such that, only when all three lights are illuminated, a person viewing from the direction of the corner will perceive a triangular pattern.

12. The smart sign of claim 11, wherein at least one of the corner light and the side lights is partially enclosed within a cover reducing the visibility of said corner light and said side lights from directions other than the direction of the corner.

13. The smart sign of claim 1, wherein the at least one set of at least three lights located on the housing is two sets of at least three lights, each of the sets being spaced about 180 degrees from each other around the housing.

14. The smart sign of claim 1, wherein the at least one set of at least three lights located on the housing is four sets of at least three lights, each of the sets being spaced about 90 degrees from each other around the housing.

15. The smart sign of claim 1, wherein the plurality of directional arrows includes a first directional arrow pointing in a first direction and a second directional arrow pointing in a second direction, the second direction being opposite the first direction.

16. The smart sign of claim 1, wherein the housing includes two opposing sides extending between the top and the bottom, a front extending between the top, the bottom, and the two sides, and a back extending between the top, the bottom, and the two sides.

17. The smart sign of claim 16, wherein one set of the at least one set of at least three lights located on the housing are three lights each located at the vertex of a triangle which are located on the front of the sign.

18. The smart sign of claim 17, further comprising an independently illuminable exit nomenclature.

19. The smart sign of claim 17, wherein the three lights are recessed in the housing effective to reduce visibility of the lights from the sides.

20. The smart sign of claim 16, wherein the plurality of directional arrows are located on the front of the housing; and wherein each of the plurality of directional arrows point in different directions on a plane defined by the front of the housing.

21. A visual signaling system accessible to colorblind and hearing impaired individuals, the system comprising:

a master controller; and a plurality of smart signs, each of said smart signs being in electronic communication with said master controller, each of the plurality of smart signs further comprising a housing including a top, a bottom, and at least one side extending between the top and the bottom; a plurality of independently illuminable directional arrows located on the housing; each of the plurality of independently illuminable directional arrows pointing in different directions; at least one set of at least three independently illuminable lights located on the housing, one of the three lights located toward the top of the housing and two of the lights located toward the bottom of the housing, these three lights each being located at a vertex of a triangle, such that, only when all three lights are illuminated, a person viewing will perceive a triangular pattern; and a controller internal to the housing, the controller configured to independently activate or deactivate each directional arrow and each light at the instruction of the master controller.

22. The visual signaling system of claim 21, wherein at least one of the plurality of smart signs is a smart sign where the plurality of directional arrows are located on the bottom of the housing; and where each of the plurality of directional arrows point in different directions on a plane defined by the bottom of the housing; and at least one of the plurality of smart signs is a smart sign where the housing includes two opposing sides extending between the top and the bottom, a front extending between the top, the bottom, and the two sides, and a back extending between the top, the bottom, and the two sides, where the plurality of directional arrows are located on the front of the housing; and where each of the plurality of directional arrows point in different directions on a plane defined by the front of the housing.

23. A method for providing visual signaling within a facility during a hazardous event, comprising:

receiving, by a master controller, electronic information from an input device regarding the location of a hazard;

communicating, by the master controller, to a plurality of smart signs each of said smart signs being in electronic communication with said master controller, each of the plurality of smart signs further comprising a housing including a top, a bottom, and at least one side extending between the top and the bottom; a plurality of independently illuminable directional arrows located on the housing; each of the plurality of independently illuminable directional arrows pointing in different directions; at least one set of at least three independently illuminable lights located on the housing, one of the three lights located toward the top of the housing and two of the lights located toward the bottom of the housing, these three lights each being located at a vertex of a triangle, such that, only when all three lights are illuminated, a person viewing will perceive a triangular pattern; and a controller internal to the housing, the controller configured to independently activate or deactivate each directional arrow and each light at the instruction of the master controller, said smart signs being located on or within the facility, instructions to activate lights and directional arrows on said plurality of smart signs to direct individuals away from the location of the hazard.

24. The method of claim 23, wherein the plurality of smart signs include at least one smart sign where the plurality of directional arrows are located on the bottom of the housing; and where each of the plurality of directional arrows point in different directions on a plane defined by the bottom of the housing;

wherein the facility includes at least two intersecting hallways forming a hallway intersection;

and wherein the at least one smart sign where the plurality of directional arrows are located on the bottom of the housing; and where each of the plurality of directional arrows point in different directions on a plane defined by the bottom of the housing is installed at the hallway intersection.

25. The method of claim 23, wherein the plurality of smart signs further includes at least one smart sign attached to an existing exit sign located on or within the facility, where the at least one smart sign is a smart sign where the housing includes two opposing sides extending between the top and the bottom, a front extending between the top, the bottom, and the two sides, and a back extending between the top, the bottom, and the two sides, where the plurality of directional arrows are located on the front of the housing; and where each of the plurality of directional arrows point in different directions on a plane defined by the front of the housing.

26. The method of claim 23, wherein said communicating includes communicating instructions to activate lights on one of the plurality of smart signs in a first pattern.

27. The method of claim 26, wherein said communicating includes communicating instructions to activate lights on one of the plurality of smart signs in a second pattern, the first pattern and second pattern being non-identical.

28. The method of claim 27, wherein said communicating includes communicating instructions to activate lights on one of the plurality of smart signs in a third pattern, the third pattern being non-identical to the first pattern and the second pattern.

* * * * *